(12) United States Patent
Muthuramalingam et al.

(10) Patent No.: US 8,418,467 B2
(45) Date of Patent: Apr. 16, 2013

(54) SYSTEM INCLUDING FEEDWATER HEATER FOR EXTRACTING HEAT FROM LOW PRESSURE STEAM TURBINE

(75) Inventors: Mahendhra Muthuramalingam, Chennai (IN); Veerappan Muthaiah, Bangalore (IN); Raub Warfield Smith, Ballston Lake, NY (US)

(73) Assignee: General Electric Company, Schenectady, NY (US)

( * ) Notice: Subject to any disclaimer, the term of this patent is extended or adjusted under 35 U.S.C. 154(b) by 408 days.

(21) Appl. No.: 12/825,597

(22) Filed: Jun. 29, 2010

(65) Prior Publication Data

US 2011/0314819 A1 Dec. 29, 2011

(51) Int. Cl.
*F01K 9/00* (2006.01)
(52) U.S. Cl.
USPC ............... 60/661; 60/678; 60/654; 60/39.182
(58) Field of Classification Search ............ 60/645–681, 60/39.182, 722, 690
See application file for complete search history.

(56) References Cited

U.S. PATENT DOCUMENTS

| | | | |
|---|---|---|---|
| 6,128,905 A | 10/2000 | Fahlsing | |
| 7,367,192 B2* | 5/2008 | Hattori et al. | 60/772 |
| 2007/0017207 A1* | 1/2007 | Smith et al. | 60/39.182 |
| 2007/0204623 A1* | 9/2007 | Rollins, III | 60/772 |
| 2009/0094983 A1* | 4/2009 | Goto et al. | 60/676 |

FOREIGN PATENT DOCUMENTS

WO 2006065632 A2 6/2006

\* cited by examiner

*Primary Examiner* — Thomas Denion
*Assistant Examiner* — Kelsey Gambrel
(74) *Attorney, Agent, or Firm* — Hoffman Warnick LLC; Ernest G. Cusick

(57) ABSTRACT

A system is disclosed including a low pressure steam turbine; an air-cooled condenser (ACC) in fluid connection with the low pressure (LP) steam turbine, the ACC for receiving a portion of steam from an exhaust of the LP steam turbine; a feedwater heater in fluid connection with the low pressure steam turbine via a conduit, the feedwater heater for receiving a portion of supply steam from the LP steam turbine; and a condensate pump in fluid connection with the ACC and the feedwater heater, the condensate pump for receiving condensate fluid from the ACC and drain fluid from the feedwater heater.

12 Claims, 2 Drawing Sheets

U.S. 8,418,467 B2

SYSTEM INCLUDING FEEDWATER HEATER FOR EXTRACTING HEAT FROM LOW PRESSURE STEAM TURBINE

BACKGROUND OF THE INVENTION

The subject matter disclosed herein relates to a system for diverting a portion of the heat rejected from a low pressure (LP) steam turbine to a feedwater heater. Specifically, the subject matter disclosed herein relates to a system for diverting a portion of the heat rejected from an LP steam turbine to a heat recovery steam generator (HRSG) via a feedwater heater.

Some power plant systems, for example, certain combined cycle (CC) power plant systems employ air-cooled condensers ACC(s) as the heat sink(s) for rejecting heat from an LP steam turbine's exhaust stream. ACCs provide gas-to-gas cooling of heat rejected from a turbine exhaust stream, which may reduce or eliminate the need for water from the condensing cycle. However, ACCs are typically large, costly apparatuses, which can yield high back-pressures that decrease the efficiency and output of the LP steam turbine (and the overall system).

BRIEF DESCRIPTION OF THE INVENTION

Solutions for diverting a portion of exhaust heat from a low pressure steam turbine are disclosed. In one embodiment, a system includes a low pressure (LP) steam turbine; an air-cooled condenser (ACC) in fluid connection with the low pressure steam turbine, the ACC for receiving a portion of steam from an exhaust of the LP steam turbine; a feedwater heater in fluid connection with the LP steam turbine via a conduit, the feedwater heater for receiving a portion of supply steam from the LP steam turbine; and a condensate pump in fluid connection with the ACC and the feedwater heater, the condensate pump for receiving condensate fluid from the ACC and drain fluid from the feedwater heater.

A first aspect provides a system including a low pressure (LP) steam turbine; an air-cooled condenser (ACC) in fluid connection with the LP steam turbine, the ACC for receiving a portion of steam from an exhaust of the LP steam turbine; a feedwater heater in fluid connection with the LP steam turbine via a conduit, the feedwater heater for receiving a portion of supply steam from the LP steam turbine; and a condensate pump in fluid connection with the ACC and the feedwater heater, the condensate pump for receiving condensate fluid from the ACC and drain fluid from the feedwater heater.

A second aspect provides a system including: a steam turbine operably connected to a shaft; a load device operably connected to the shaft; a low pressure steam turbine in fluid connection with the steam turbine and operably connected to the shaft; an air-cooled condenser (ACC) in fluid connection with the low pressure steam turbine, the ACC for receiving a portion of steam from an exhaust of the low pressure steam turbine; a feedwater heater in fluid connection with the low pressure steam turbine via a conduit, the feedwater heater for receiving a portion of supply steam from the low pressure steam turbine; and a condensate pump in fluid connection with the ACC and the feedwater heater, the condensate pump for receiving condensate fluid from the ACC and drain fluid from the feedwater heater.

A third aspect provides a combined cycle system comprising: a gas turbine operably connected to a first shaft and fluidly connected to a heat recovery steam generator (HRSG); a first load device operably connected to the first shaft; a steam turbine operably connected to one of the first shaft or a second shaft and fluidly connected to the HRSG; a low pressure steam turbine in fluid connection with the steam turbine and the HRSG, and operably connected to the one of the first shaft or the second shaft operably connected to the steam turbine; an air-cooled condenser (ACC) in fluid connection with the low pressure steam turbine, the ACC for receiving a portion of steam from an exhaust of the low pressure steam turbine; a feedwater heater in fluid connection with the low pressure steam turbine via a conduit, the feedwater heater for receiving a portion of supply steam from the low pressure steam turbine; and a condensate pump in fluid connection with the ACC and the feedwater heater, the condensate pump for receiving condensate fluid from the ACC and drain fluid from the feedwater heater.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

It is noted that the drawings of the invention are not to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

As indicated above, aspects of the disclosure provide for diverting a portion of the heat rejected from a low-pressure (LP) steam turbine to a heat recovery steam generator (HRSG) via a feedwater heater. The feedwater heater increases the HRSG inlet feedwater temperature, thereby reducing feedwater economizing duty in the HRSG. The portion of the heat rejection that is diverted away from an air-cooled condenser (ACC) is shifted to the HRSG, resulting in a higher HRSG stack temperature and reduced heat rejection from the ACC.

Some power plant systems, for example, certain combined cycle (CC) power plant systems can employ ACC(s) as the heat sink(s) for rejecting heat from an LP steam turbine's exhaust stream. ACCs provide gas-to-gas cooling of heat rejected from a turbine exhaust stream, which may reduce or eliminate the need for water from the condensing cycle. ACCs also allow for greater flexibility in locating a power plant system, as proximity to water and/or other environmental factors may be less of a concern when planning a power plant system including an ACC.

The potential of an ACC to transfer heat from the working fluid (e.g., steam) it condenses is controlled by the saturation temperature of that steam, the ambient dry bulb temperature, and the surface area (size) of the ACC. In order to effectively transfer heat under a variety of ambient conditions, ACCs are sized to provide the best balance of cost and performance at a customer rating condition. Because the heat exchange from an ACC is to air, the ACC is typically a large apparatus having a large surface area. For example, a typical ACC in a combined cycle power plant system may have a footprint as big as several thousand square feet. Additionally, since site ambient air temperature typically varies over a wide range, a plant utilizing an ACC will yield high back-pressure on hot days, decreasing the efficiency and output of the LP steam turbine (and the overall system) in comparison to a water-cooled heat rejection system.

Figure 1:
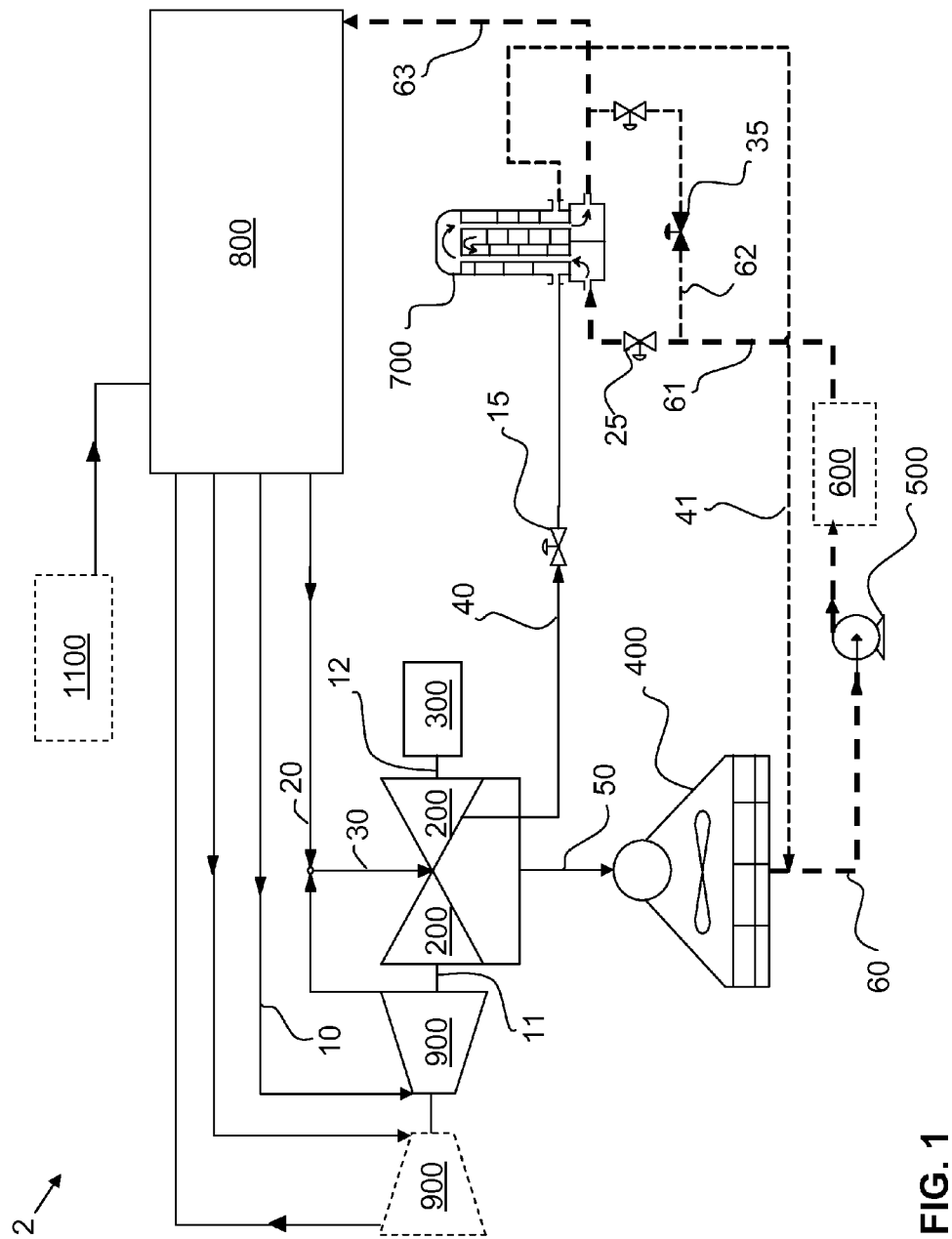
FIG. 1 shows a schematic diagram of a system according to an embodiment.

As indicated above, aspects of the disclosure provide for a system including a feedwater heater, the feedwater heater for diverting a portion of the heat rejected from an LP steam turbine away from an ACC and to an HRSG. Turning to FIG. 1, a system 2 is shown including a low pressure (LP) steam turbine 200 (double-flow steam turbine shown), an air-cooled condenser (ACC) 400, a feedwater heater 700, a condensate pump 500 and a gland seal condenser 600 (optional, shown in phantom). Also shown in system 2 are additional components: a steam turbine (e.g., a high pressure/intermediate pressure (HP/IP) steam turbine) 900, a load device 300 (e.g., dynamoelectric machine, compressor, pump, or other mechanical device), a heat recovery steam generator (HRSG) 800, conduits 10, 20, 30, 40, 41, 50, 60, 61, 62, 63, and valves 15, 25, 35. Also shown in phantom is a gas turbine 1100, which is described in greater detail with reference to FIG. 2. ACC 400 is shown in fluid connection with at least one LP steam turbine 200 via one or more conduits 50. In the embodiment shown in FIG. 1, ACC 400 is in fluid connection with two LP steam turbines 200 in this double-flow steam turbine configuration. However, it is understood that ACC 400 may be in fluid connection with only one LP steam turbine 200 in other embodiments. In any case, ACC 400 may receive a portion of steam from an exhaust of the LP steam turbine(s) 200. That is, ACC 400 may receive a portion of steam that has already performed mechanical work in LP steam turbine 200 (e.g., via expansion and flow across turbine blades). ACC 400 may function as any conventional air-cooled condenser, and may include, e.g., a fan-aided mechanism and/or a hyperbolic tower. ACC 400 may further include one or more of single-row or multi-row heat exchangers, which are known in the art.

After extracting the portion of steam from LP steam turbine 200 exhaust, ACC 400 may condense the extracted steam into a condensate fluid to be pumped by condensate pump 500. Condensate pump 500 and ACC 400 may be fluidly connected by a conduit 60, which allows condensate pump 500 to draw condensate fluid from ACC 400 and deliver that condensate fluid to feedwater heater 700 (or, optionally, a gland seal condenser 600, shown in phantom). In an embodiment including a gland seal condenser 600, gland seal condenser 600 may be any conventional gland seal condenser 600 that heats the condensate fluid received from condensate pump 500 to produce a preheated condensate. In this embodiment, the preheated condensate may be provided to feedwater heater 700 via a conduit 61. In another embodiment not including gland seal condenser 600, condensate pump 500 may provide the condensate fluid directly to feedwater heater 700, without preheating (e.g., via conduit 61).

As shown in FIG. 1, in one embodiment, feedwater heater 700 is in fluid connection with the gland seal condenser 600 (or, alternatively, the condensate pump 500) via conduit 61 (including a feedwater heater isolation valve 25). However, in one embodiment, a portion of the preheated (or not preheated, where gland seal condenser 600 is not included) condensate may bypass feedwater heater 700 by at least partially opening a bypass valve 35 (darkened for illustrative purposes), allowing the portion of condensate received either directly from condensate pump 500 or from gland seal condenser 600 (e.g., as preheated condensate) to flow through a bypass conduit 62. In this case, the portion of the condensate flowing through bypass conduit 62 is directed to HRSG 800 (after rejoining the condensate leaving feedwater heater 700) via an additional conduit 63. It is further understood that in another alternative embodiment, valve 15 may be used to control the heating duty of feedwater heater 700 (by controlling an amount of supply steam extracted from LP steam turbine 200 and provided to feedwater heater 700). Where valve 15 is used to control the amount of supply steam extracted from LP steam turbine 200, it may partially control the temperature of feedwater leaving feedwater heater 700 (and entering HRSG 800 via conduit 63). In this embodiment, the use of valve 15 to control the amount of supply steam provided to feedwater heater 700 may better control the feedwater temperature entering HRSG 800 (via conduit 63) allowing elimination of bypass valve 35 (and feedwater heater isolation valve 25), described in the embodiment above.

Feedwater heater 700 is also fluidly connected to the LP steam turbine 200 via a conduit 40. In one embodiment, feedwater heater 700 receives a portion of supply steam from LP steam turbine 200 through interstage extraction, or from the LP steam turbine 200 inlet. This portion of supply steam is extracted prior to it entering at least one stage of LP steam turbine 200 and performing mechanical work. This portion of supply steam extracted from LP steam turbine 200 is distinct from the portion of steam sent from an exhaust of LP steam turbine 200 and directed to ACC 400. That is, a portion of the total steam supplied to the LP steam turbine 200 is diverted away from ACC 400 and sent to feedwater heater 700 (via conduit 40, including an extraction valve 15) prior to performing mechanical work in at least one stage of the LP steam turbine. In one embodiment, the portion of LP steam turbine supply steam diverted to feedwater heater 700 is smaller (in quantity) than the portion of exhaust steam sent to ACC 400. In one case, the portion of supply steam extracted and diverted to feedwater heater 700 is approximately 1 percent to approximately 40 percent of the total steam supplied to LP steam turbine 200. In one particular embodiment, the portion of supply steam extracted and diverted to feedwater heater 700 is approximately 5-20%, and more specifically, may be approximately 15% of the total steam supplied to the LP steam turbine 200. In any case, feedwater heater 700 may extract a portion of the total steam supplied to the LP steam turbine 200 and use that extraction steam to further heat the condensate provided from gland seal condenser 600 (in phantom) or directly from condensate pump 500 (and not sent through bypass conduit 62). Feedwater heater 700 may be any conventional feedwater heater (e.g., a shell and tube heat exchanger) which may increase the temperature of the condensate (using extraction steam) substantially to its saturation temperature. Feedwater heater 700 may produce: heated feedwater, which may be fed to HRSG 800 via a conduit 63; and drain fluid (or "drains", representing the condensed extraction steam), which may be fed back to a suction portion of condensate pump 500 via a drain conduit 41 (and via conduit 60). Alternatively, as is known in the art, the drain fluid may be fed via a separate pump into the heated feedwater going to HRSG 800 (pump omitted for clarity).

In one embodiment, feedwater heater 700 may extract a portion of the inter-stage steam supplied to the LP steam turbine 200 from a second-to-last stage of the turbine. For example, in an embodiment where the LP steam turbine 200 has four (5) stages, the inter-stage steam extracted by feedwater heater 700 may be taken from the fourth stage of the turbine. However, it is understood that in other embodiments, steam may be extracted from the bowl, first stage, second stage, third stage, etc. of LP steam turbine 200.

As indicated above, feedwater heated by feedwater heater 700 may be provided to HRSG 800 via a conduit 63. HRSG 800 may be any conventional heat recovery steam generator, which, e.g., recovers heat from a hot gas exhaust of a gas turbine (1100, shown in phantom) to heat water (e.g., feedwater or other condensate such as the second condensate) and produce steam. This steam supplied (as supply steam) to one or more steam turbine components (e.g., steam turbine 900, and/or LP steam turbine 200, with steam delivered via conduits) may be used to drive those components.

As shown in FIG. 1, system 2 may further include a steam turbine (e.g., a HP/IP steam turbine) 900, which may be any conventional high pressure and/or high pressure/intermediate pressure (HP/IP) steam turbine capable of producing rotational energy via the expansion and flow of steam through its turbine stages. That is, steam turbine 900 may include separate high-pressure and intermediate-pressure turbines, depicted as separate elements in FIGS. 1 and 2 or a combined HP/IP section as appropriate to a reheat steam cycle. However, in another embodiment not including a reheat cycle, steam turbine 900 may only include the high-pressure section (where left-hand turbine section is removed from system 2, depicted in phantom). In any case, steam turbine 900 may be mechanically coupled to one or more LP steam turbines 200 via a shaft 11. LP steam turbine(s) 200 may be further coupled to the load device 300 (e.g., dynamoelectric machine, compressor, pump, or mechanical device), via a second shaft 12. Shaft 11 and second shaft 12 may be separate shafts coupled together, or may be formed as one continuous shaft. In any case, during operation of system 2, rotation of the LP steam turbine(s) 200 and/or steam turbine 900 may drive load device 300 to, e.g., generate electricity or mechanical work, as is known in the art.

Figure 2:
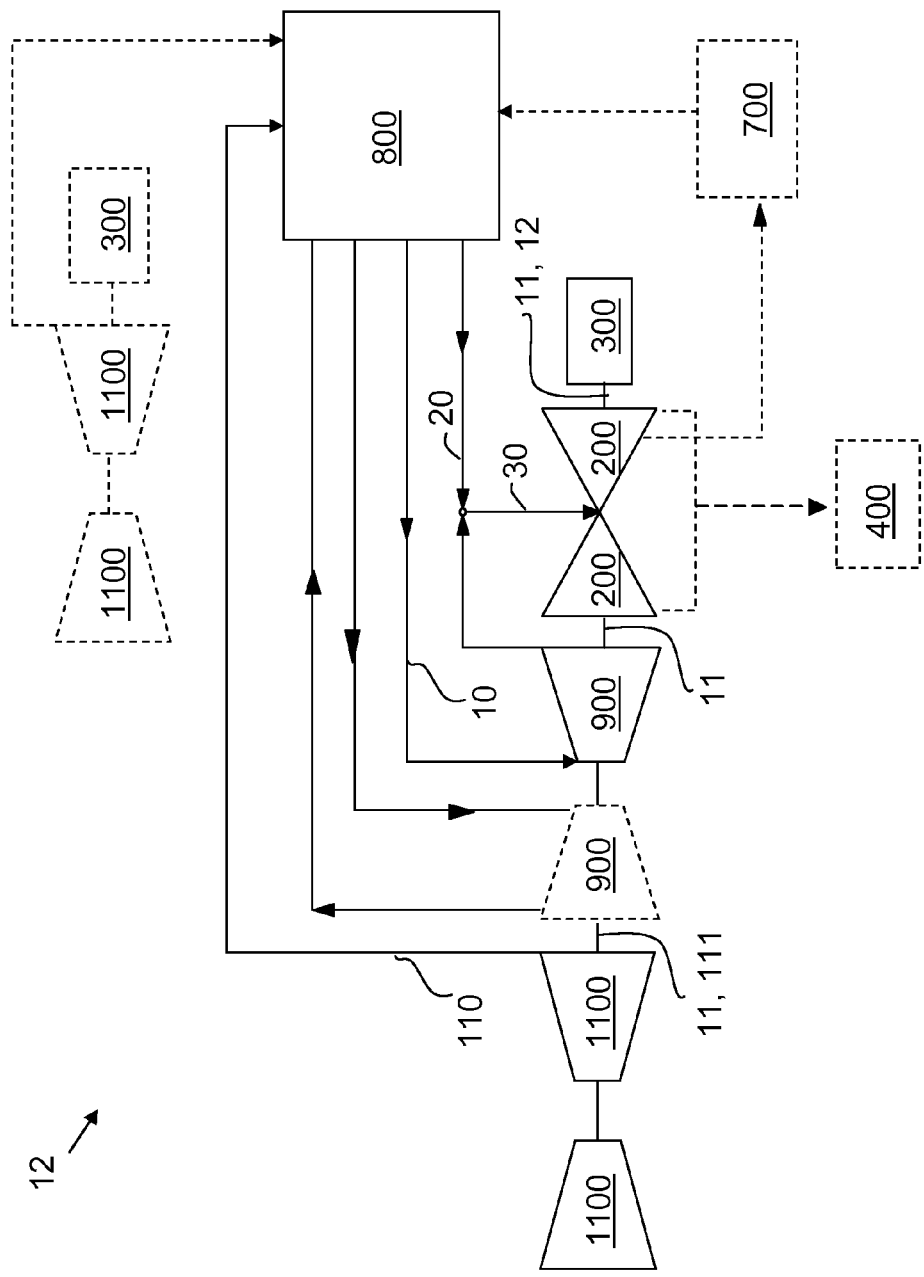
FIG. 2 shows a schematic diagram of a combined-cycle system according to an embodiment.

Turning to FIG. 2, a single-shaft combined cycle system 12 is shown including several components shown and described with reference to FIG. 1. Combined cycle system 12 is shown additionally including a gas turbine 1100 (shown in phantom in FIG. 1) operably coupled to load device 300 (via shafts 11, 12). As is known in the art, gas turbine 1100 may include both compressor and turbine expansion sections connected to a load device 300. Gas turbine 1100 may function as any conventional gas turbine, e.g., by creating rotational energy via the expansion and flow of a gas (from a burned fuel) through its turbine stages. Gas turbine 1100 may transmit that rotational energy to a load device (e.g., load device 300) via shafts 11, 12, 111 (or any other combination of similar shafts). Where load device 300 is an electric generator, this rotational energy may be used to generate electricity, as is known in the art. As is further known in the art, exhaust heat from gas turbine 1100 may be provided to HRSG 800 via a conduit 110 for use in producing supply steam to power steam turbine 900 and/or LP steam turbine(s) 200. As is known in the art, the plurality of steam turbines (200, 900) may be mechanically coupled via a common shaft, or may be mechanically coupled via separate shafts. In any case, steam turbine 900 and LP steam turbine(s) 200 may be mechanically coupled a load device 300. Additionally, as is known in the art, gas turbine 1100 may be mechanically coupled to the plurality of steam turbines (900, 200) on a common shaft (e.g., shaft 11). This single-shaft 11 may be coupled to a load device 300 (e.g., a dynamoelectric device) as is known in the art.

Alternatively, as is shown in phantom, a multi-shaft configuration may be used according to an embodiment. In this embodiment, gas turbine 1100 may be operably connected to at least one load device 300 independently of steam turbine 900 and LP steam turbine 200. In this case, gas turbine 1100 may transmit rotational energy to load device 300 via one or more shafts, but gas turbine 1100 is not coupled to steam turbine 900 and LP steam turbine 200 via a common shaft.

Components shown in phantom or not shown in FIG. 2 may function as described with respect to FIG. 1. That is, for the purposes of clarity, components and connections between those components have been omitted from FIG. 2 which are included in combined cycle system 12. It is understood that these omitted components may interact with those components shown and described with respect to FIG. 2 as described with reference to FIG. 1.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A system comprising:
   a low pressure (LP) steam turbine;
   an air-cooled condenser (ACC) in fluid connection with the low pressure steam turbine, the ACC for receiving a portion of steam from an exhaust of the low pressure steam turbine;
   a feedwater heater in fluid connection with the low pressure steam turbine via a conduit, the feedwater heater for receiving a portion of supply steam from the LP steam turbine,
   wherein the portion of supply steam is extracted from the LP steam turbine by interstage extraction, wherein the portion of supply steam extracted is approximately 1-40 percent of a total portion of LP steam supplied to the LP steam turbine;
   a condensate pump in fluid connection with the ACC and the feedwater heater, the condensate pump for receiving condensate fluid from the ACC and drain fluid from the feedwater heater;
   a heat recovery steam generator (HRSG) fluidly connected to the feedwater heater and the low pressure steam turbine, the HRSG for receiving heated feedwater from the feedwater heater;
   a gland seal condenser in fluid connection with the condensate pump and the feedwater heater, the gland seal condenser for providing a preheated condensate fluid to the feedwater heater; and
   a bypass conduit and a bypass valve operably connected thereto, the bypass conduit allowing a portion of the preheated condensate fluid to bypass the feedwater heater and be received by the HRSG in the case that the bypass valve is not closed.

2. The system of claim 1, further comprising a feedwater heater extraction valve operably connected to the conduit for controlling the portion of supply steam extracted.

3. The system of claim 1, further comprising a drain conduit fluidly connecting the feedwater heater and the condensate pump, the drain conduit for providing a drain fluid from the feedwater heater to a suction portion of the condensate pump.

4. A system comprising:
a steam turbine operably connected to a shaft;
a load device operably connected to the shaft;
a low pressure (LP) steam turbine in fluid connection with the steam turbine and operably connected to the shaft;
an air-cooled condenser (ACC) in fluid connection with the low pressure steam turbine, the ACC for receiving a portion of steam from an exhaust of the low pressure steam turbine;
a feedwater heater in fluid connection with the low pressure steam turbine via a conduit, the feedwater heater for receiving a portion of supply steam from the LP steam turbine;
a condensate pump in fluid connection with the ACC and the feedwater heater, the condensate pump for receiving condensate fluid from the ACC and drain fluid from the feedwater heater,
a heat recovery steam generator (HRSG) fluidly connected to the feedwater heater, the low pressure steam turbine, and the steam turbine, the HRSG receiving heated feedwater from the feedwater heater;
a gland seal condenser in fluid connection with the condensate pump and the feedwater heater, the gland seal condenser for providing a preheated condensate fluid to the feedwater heater; and
a bypass conduit and a bypass valve operably connected thereto, the bypass conduit allowing a portion of the preheated condensate fluid to bypass the feedwater heater and be received by the HRSG in the case that the bypass valve is not closed.

5. The system of claim 4, wherein the portion of supply steam is extracted from the LP steam turbine by interstage extraction.

6. The system of claim 5, wherein the portion of supply steam extracted is approximately 1-40 percent of a total portion of LP steam supplied to the LP steam turbine.

7. The system of claim 5, further comprising a feedwater heater extraction valve operably connected to the conduit for controlling the portion of supply steam extracted.

8. The system of claim 4, further comprising a drain conduit fluidly connecting the feedwater heater and the condensate pump, the drain conduit for providing a drain fluid from the feedwater heater to a suction portion of the condensate pump.

9. A combined cycle system comprising:
a gas turbine operably connected to a first shaft and fluidly connected to a heat recovery steam generator (HRSG);
a first load device operably connected to the first shaft;
a steam turbine operably connected to one of the first shaft or a second shaft and fluidly connected to the HRSG;
a low pressure (LP) steam turbine in fluid connection with the steam turbine and the HRSG, and operably connected to the one of the first shaft or the second shaft operably connected to the steam turbine;
an air-cooled condenser (ACC) in fluid connection with the low pressure steam turbine, the ACC for receiving a portion of steam from an exhaust of the low pressure steam turbine;
a feedwater heater in fluid connection with the low pressure steam turbine via a conduit, the feedwater heater for receiving a portion of supply steam from the LP steam turbine;
a condensate pump in fluid connection with the ACC and the feedwater heater, the condensate pump for receiving condensate fluid from the ACC and drain fluid from the feedwater heater,
a heat recovery steam generator (HRSG) fluidly connected to the feedwater heater, the low pressure steam turbine, and the steam turbine, the HRSG receiving heated feedwater from the feedwater heater;
a gland seal condenser in fluid connection with the condensate pump and the feedwater heater, the gland seal condenser for providing a preheated condensate fluid to the feedwater heater; and
a bypass conduit and a bypass valve operably connected thereto, the bypass conduit allowing a portion of the preheated condensate fluid to bypass the feedwater heater and be received by the HRSG in the case that the bypass valve is not closed.

10. The combined cycle system of claim 9, wherein the portion of supply steam is extracted from the LP steam turbine by interstage extraction.

11. The combined cycle system of claim 10, wherein the portion of supply steam extracted is approximately 1-40 percent of a total portion of steam supplied to the LP steam turbine.

12. The combined cycle system of claim 9, further comprising a second load device operably connected to the second shaft in the case that at least one of the steam turbine or the LP steam turbine is operably connected to the second shaft.

* * * * *